(12) United States Patent
Wang

(10) Patent No.: US 8,977,828 B2
(45) Date of Patent: Mar. 10, 2015

(54) DATA RECOVERY USING CONVERSION OF BACKUP TO VIRTUAL DISK

(75) Inventor: Zhiye Wang, Beijing (CN)

(73) Assignee: CA, Inc., New York, NY (US)

( * ) Notice: Subject to any disclaimer, the term of this patent is extended or adjusted under 35 U.S.C. 154(b) by 263 days.

(21) Appl. No.: 13/529,380

(22) Filed: Jun. 21, 2012

(65) Prior Publication Data

US 2013/0346709 A1    Dec. 26, 2013

(51) Int. Cl.
*G06F 12/00*    (2006.01)

(52) U.S. Cl.
USPC ........................................... 711/162

(58) Field of Classification Search
None
See application file for complete search history.

(56) References Cited

U.S. PATENT DOCUMENTS

| | | | |
|---|---|---|---|
| 6,567,889 B1 | 5/2003 | DeKoning et al. | |
| 6,948,039 B2 | 9/2005 | Biessener et al. | |
| 7,093,086 B1 | 8/2006 | van Rietschote | |
| 7,299,326 B2 | 11/2007 | Lin et al. | |
| 7,330,947 B2 | 2/2008 | Hasegawa | |
| 7,499,957 B2 | 3/2009 | Kanevsky et al. | |
| 7,512,758 B2 | 3/2009 | Lin et al. | |
| 7,533,229 B1 | 5/2009 | van Rietschote | |
| 7,865,473 B2 | 1/2011 | Augenstein et al. | |
| 8,037,032 B2 | 10/2011 | Pershin et al. | |
| 8,046,550 B2 | 10/2011 | Feathergill | |
| 8,060,476 B1 | 11/2011 | Afonso et al. | |
| 8,099,391 B1 | 1/2012 | Monckton | |
| 8,135,748 B2 | 3/2012 | Rosikiewicz et al. | |
| 8,209,680 B1* | 6/2012 | Le et al. | 717/174 |
| 2003/0115432 A1 | 6/2003 | Biessener et al. | |
| 2004/0205390 A1 | 10/2004 | Kanevsky et al. | |
| 2005/0278493 A1 | 12/2005 | Lin et al. | |
| 2006/0179261 A1* | 8/2006 | Rajan | 711/162 |
| 2007/0208918 A1 | 9/2007 | Harbin et al. | |
| 2008/0282047 A1 | 11/2008 | Arakawa et al. | |
| 2010/0262794 A1 | 10/2010 | De Beer et al. | |
| 2010/0262797 A1 | 10/2010 | Rosikiewicz et al. | |
| 2010/0287140 A1 | 11/2010 | Oza | |
| 2011/0010515 A1 | 1/2011 | Ranade | |
| 2011/0047340 A1* | 2/2011 | Olson et al. | 711/162 |
| 2011/0078119 A1 | 3/2011 | Soran et al. | |
| 2011/0107052 A1* | 5/2011 | Narayanasamy | 711/171 |
| 2011/0219201 A1* | 9/2011 | Ranade | 711/162 |
| 2012/0072685 A1 | 3/2012 | Otani | |

OTHER PUBLICATIONS

"User Space" http://en.wikipedia.com/wiki/User_space as archived by www.archive.org on May 4, 2004.*

* cited by examiner

*Primary Examiner* — Matthew Bradley
*Assistant Examiner* — Daniel Tsui
(74) *Attorney, Agent, or Firm* — Schwegman Lundberg & Woessner, P.A.

(57) ABSTRACT

A system includes a proxy processor configured to simulate a virtual disk, and a daemon processor in communication with the proxy processor and a backup repository. The proxy processor is configured to receive from an application a read request or a write request and to direct the read request or the write request to the daemon processor. The daemon processor is configured to receive the read request from the proxy processor and to access the backup repository or the simulated virtual disk, and to receive the write request from the proxy processor and to write data in the write request to the simulated virtual disk.

30 Claims, 5 Drawing Sheets

DATA RECOVERY USING CONVERSION OF BACKUP TO VIRTUAL DISK

BACKGROUND

If a production computer system crashes, the system operator would like to recover the production system and get it back up and running as quickly as possible. However, many such production systems contain a vast amount of data, so the recovery process consequently could take several hours or more. This is simply not acceptable in many production environments, and an immediate recovery is desired by most systems operators and users.

BRIEF SUMMARY

According to one aspect of the present disclosure, a system includes a proxy processor that is configured to simulate a virtual disk, a daemon processor that is in communication with the proxy processor and a backup repository, and a processor that is configured to read from the backup repository and return plaintext data to the daemon processor. The proxy processor is configured to receive from an application read requests and write requests for the simulated virtual disk and to direct the read and write requests to the daemon processor. The daemon processor is configured to receive the read request from the proxy processor and to access the backup repository or the simulated virtual disk. The daemon processor is configured to receive a write request from the proxy processor and to write data in the write request to the simulated virtual disk.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
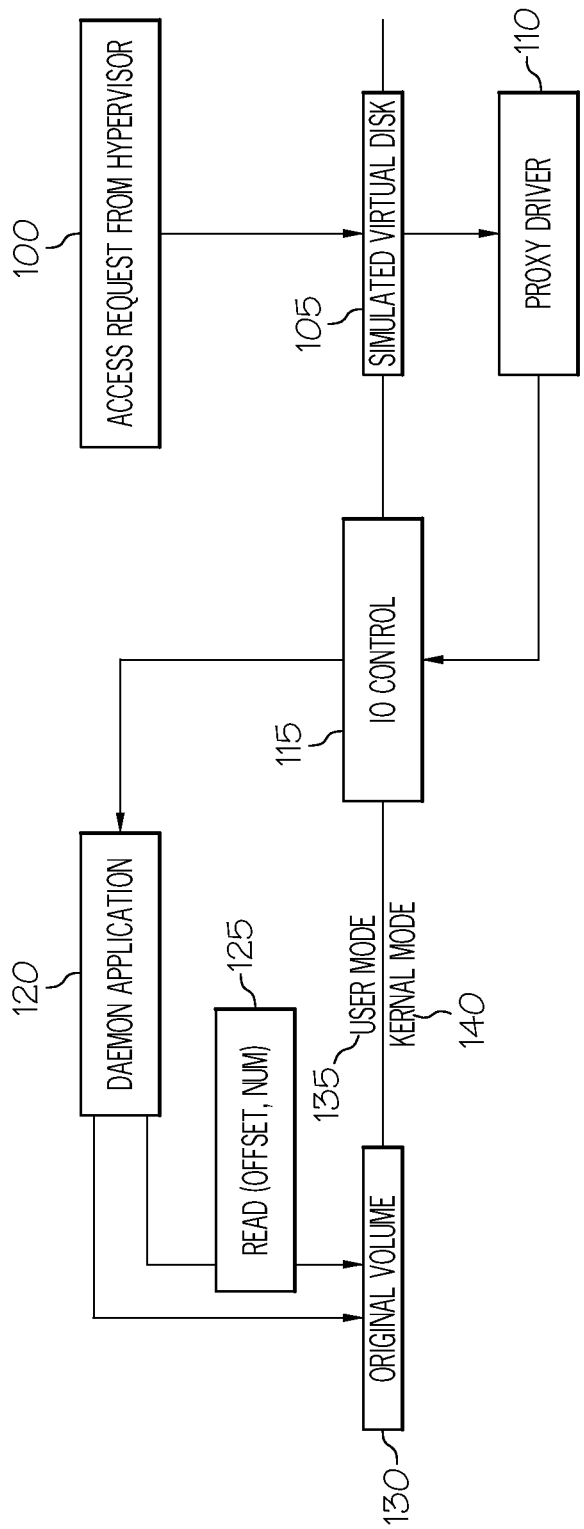
FIG. 1 illustrates an example system for data recovery using conversion of backup data to a virtual disk.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure relates to a system and method to convert a disk backup to a virtual disk, and more specifically, in an embodiment, a system and method to convert a disk backup to a virtual disk on demand or "on the fly" so that the virtual disk is available for instant data recovery.

In a general method of data recovery, a production machine is backed up every day, the backup is converted to a virtual disk, a virtual machine is created based on the virtual disk, and the virtual machine is then powered on. While the virtual machine will function just like the original production machine, the conversion to the virtual disk could consume copious amounts of CPU cycles and network resources. Additionally, the converted virtual disk could consume a vast amount of storage resources. If such a conversion operation is done after every backup, this consumes a tremendous amount of resources. However, on the other hand, if a system operator does not generate a virtual disk after every backup, the virtual machine cannot be immediately run if the production machine crashes because, as just noted, the convert operation could take a long time.

An embodiment of the current disclosure provides a system and method for instant recovery of a production computer system in the event of a system crash or other system problem. The system and method covert a backup to a virtual disk on the fly and on demand. In an embodiment, this on the fly conversion occurs during write requests in the virtual machine or non-production system. Consequently, a system operator or user can power on a virtual machine at anytime since a backup need not be "converted" after every backup job run. The system and method also conserve system resources since no resources are needed for a conversion after every backup. The system and method could be used in conjunction with Microsoft Hyper-V and Virtual PC.

A disk to disk (D2D) backup is a particular type of backup method. It generally backs up the whole source disk (or volume) to another disk (backup repository), and the backed up data can be restored to a new disk (or volume). The backup and restore processes generally read or write data by block (a group of sectors on disk). The D2D backup generally contains two kinds of backup types: (1) a full backup, which backs up all data on the source disk; and (2) an incremental backup, which backs up only changed data since the last backup. Therefore, when one has to restore data from an incremental backup, there must first be a check to determine if the data is in the current incremental backup. If the data to be restored is in the current incremental backup, then the system proceeds to restore the data from the incremental backup. If the data to be restored is not in the current incremental backup, then the system checks the previous incremental backup to determine if the data to be restored is in the previous incremental backup. In the worst case, the data is not in any previous incremental backup, and the data can be found in the most recent full backup.

Virtualization technology has become very popular in recent years. The technology utilizes hardware resources better than before. For backup software, virtualization technology provides many other possibilities, such as restoring individual files by mounting a virtual disk, or restoring the whole system instantly by running a virtual machine from virtual disks.

The nature of D2D backup data makes it possible to convert the backed up data into a virtual disk. Backup software exists that converts backup data to a virtual disk. However, the whole process can take several hours, and the process can consume much CPU time, network bandwidth, disk I/O, and disk space. Since the process takes a long time, in order to be ready when a virtual disk is required, backup data has to be converted into a virtual disk after every backup job, no matter whether the data is eventually used or not.

An embodiment relates to a system and method that can covert backup data to a virtual disk on the fly. That means, once the method is applied, backup data is converted into a virtual disk immediately. This further means that the virtual disk can be provided for use on demand. There is no need to prepare the virtual disk in advance.

Certain terms will be used in this disclosure. A backup or the process of backing up is the making of copies of data that may be used to restore original data after a data loss event.

A sparse file is a type of computer file that attempts to use file system space more efficiently when blocks that are allocated to the file are mostly empty. This is achieved by writing brief information (metadata) representing the empty blocks to disk instead of the actual "empty" space that makes up the block using less disk space. The full block size is written to the disk as the actual size only when the block contains "real" (non-empty) data.

Deduplication is a specialized data compression technique for eliminating coarse-grained redundant data. The technique is used to improve storage utilization and it can also be applied to network data transfers to reduce the number of bytes that must be sent across a link.

A hypervisor is also called virtual machine manager (VMM). It is one of many hardware virtualization techniques allowing multiple operating systems, termed guests, to run concurrently on a host computer. Example software includes VMware ESX and Microsoft Hyper-V.

A virtual disk is a single file containing the complete contents and structure representing a data storage medium or device, such as a hard drive. It is used by a virtual machine as if it's hard disk.

A virtual machine is a software implementation of a machine (i.e. a computer) that executes programs like a physical machine.

To be able to restore data from backup data, backup software generally has a function that can read data from the backup data. This function may have the following general prototype: data read_from_backup (long offset, int num). The function takes two parameters from a calling process. First, the "offset" specifies from where the data should be read. It is generally the offset relative to the start position of a disk. The "num" parameter specifies the number of blocks to be read. A block is generally a multiple of disk sector size (e.g. 512 bytes). The function returns "plain-text data" which is read according to filled parameters. The term "plain-text data" means this function hides many internal formats of the backup data. Specifically, the backup data could be compressed, but this function will return uncompressed data. The backup data could be encrypted, but this function will return plaintext data. The backup data could be deduplicated, but this function will return un-deduplicated data. The blocks of backup data to be read could be distributed between a full backup and several incremental backups, but this function will read blocks from the appropriate backups, and return a consolidated result to the caller. The function may get data from a specified local path, or get data from a remote server. The caller does not need to be concerned about the location of the backup data. The function above is required for backup software to restore the whole disk. So, an embodiment of this disclosure uses such backup software.

Referring to FIG. 1, there are three components in an embodiment. First, there is a proxy driver 110 in a kernel space 140. The proxy driver 110 simulates a virtual disk 105 and presents the simulated virtual disk in a user space 135. All access to this simulated virtual disk 105 is redirected to a daemon application 120 in the user space 135. The proxy driver uses IO control 115 (or any other possible mechanism) to communicate with the daemon application. Second, as noted, there is a daemon application in the user space. The daemon application receives a request from the proxy driver, and it decides how to fulfill that request. Third, there is an existing module 125 that can provide a "read_from_backup" function as disclosed above. In an embodiment, it is part of existing backup software. The read operation reads from an original volume 130 on which the simulated virtual disk is stored. Backup data may also be stored on this volume. The three components of the proxy driver, daemon application, and backup processor function as a control machine for a virtual machine that can immediately replace a production computer system when that production system crashes.

The proxy driver 110 is relatively simple. It just simulates a volume 105 and presents the volume to user space applications 100. The user space application (such as hypervisor) will look for a virtual disk from this volume. The proxy driver itself does not deal with any access request that comes from the user space. It just passes the request to the daemon application in the user space. The daemon application processes the request and returns the result to the proxy driver, and then the proxy driver returns the result to the user space application that originally initiated the request.

The daemon application receives the request from the proxy driver and processes it. There are two kinds of access operations. First, there is an access operation that needs special processing in the daemon application. Second, there is an access operation that does not need special processing. The daemon application fulfills the second kind of access operation by directly accessing the backup repository. The first type of access operation is described in more detail below.

With the processing of the proxy driver and the daemon application, the simulated virtual disk looks like a mirror of the original volume, except that the daemon application executes some special processing for the files created by itself. For examples, files created by a write operation (since the system does not want to write to the backup repository). This special processing will be described in more detail below. The daemon application can deal with two kinds of virtual disks—a VMDK (Virtual Machine Disk) and a VHD (Virtual Hard Disk). The VMDK works for VMware hypervisor, and the VHD works for Microsoft hypervisor.

There is some processing that is common for all kinds of virtual disks. First, to simulate a virtual disk from backup data, the daemon application will create two files. First, there is a data file that represents a simulated virtual disk. This is a sparse file. It contains no data initially. If there is a "write" request to the virtual disk, it's also used to cache the "write" data. Second, there is a descriptive file that describes the properties of the simulated virtual disk.

The size and file name extension for these files could be different for different virtual disk technologies. The daemon application maintains a bitmap. Every bit in the bitmap represents a block on disk (on the production file or the backup repository, since the backup repository is a mirror image of the production file). The first bit represents the first block on the disk, and the last bit represents the last block on the disk. The size of a block should be an integral multiple of the disk sector size (i.e. 512 bytes), and should be the same as defined for backup data. A bit "0" represents there was no write operation to a corresponding block, and a bit "1" represents there was write operation to the corresponding block.

Figures 2, 3A, 3B:
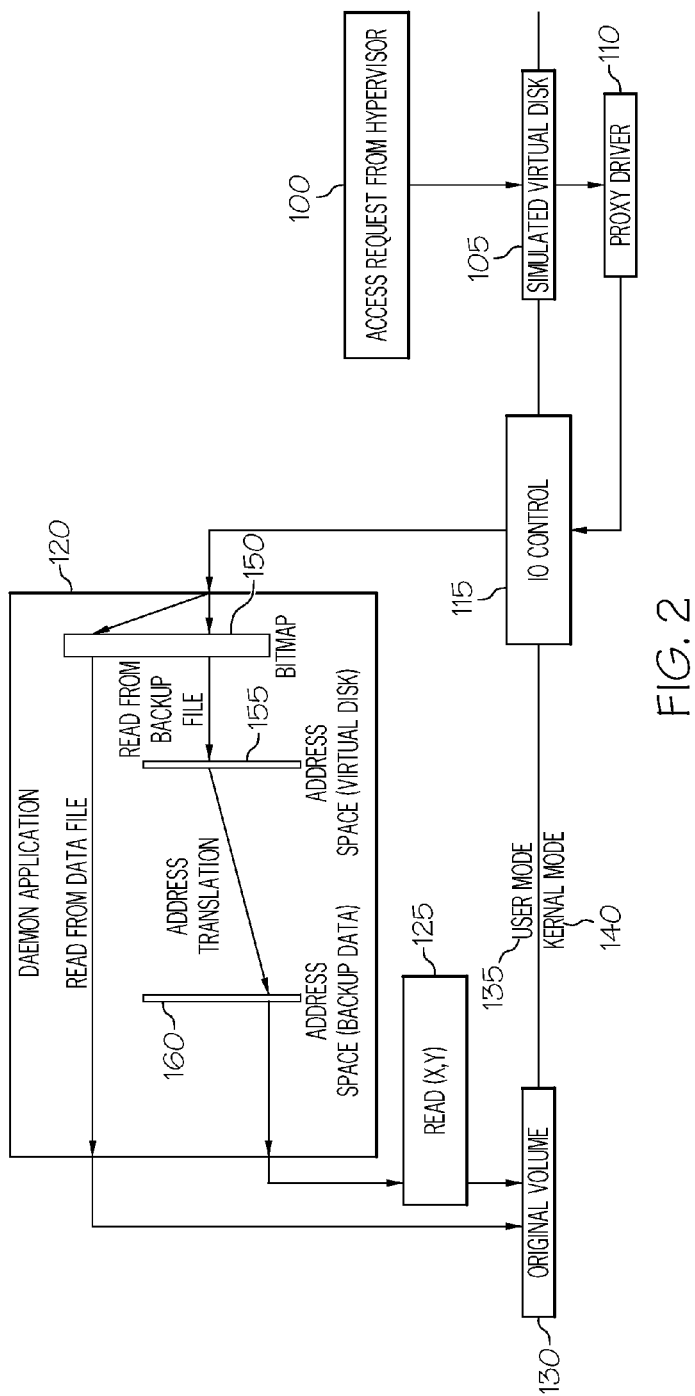
FIG. 2 illustrates another example system for data recovery using conversion of backup data to a virtual disk.
FIG. 3A is a block diagram of retrieving data from a read request and merging it with data that is to be written.
FIG. 3B is a block diagram of retrieving data that spans two blocks and merging it with data that is to be written.

Referring to FIG. 2, when a hypervisor in the user space initiates a "read" request to the data file represented on the simulated virtual disk, the proxy driver in kernel space will pass the request to the daemon application. The "read" request from the proxy driver generally contains two parameters. The first parameter is the start position where the data should be read. It is the offset from the start of the disk. The second parameter is the size of the data. It should be an integral multiple of the disk sector size (i.e. 512 bytes). Once the daemon application gets a "read" request from the proxy server, it will first check the bitmap 150 to determine where to get the data. If a bit is "1", then the daemon application reads the corresponding block from the simulated virtual disk (125, 130, 155, 160). If a bit is "0", then the daemon application reads the corresponding block from the backup repository (130). Here, the daemon application calls an existing function such as "read_from_backup" to get data from the backup repository. For "read" requests to the descriptive file, the daemon application does not do any special processing. It just fulfills the request by reading the descriptive file on the original volume.

When a hypervisor in the user space initiates a "write" request to the data file represented as the simulated virtual disk, the proxy driver in kernel space will pass the request to the daemon application. The "write" request from the proxy driver generally contains three parameters. The first parameter is the offset that represents where the data should be written. The second parameter is the size of the data. It must be integral multiple of disk sector size (i.e. 512 bytes). The third parameter is the data itself. Once the daemon application receives a "write" request from the proxy driver, it will first write the data to the data file (not the backup repository) at the specified offset. The daemon application then sets the bits that represent the blocks just written to "1". It's possible that for one "write" request, its data size is less than the size of one block (FIG. 3A), or that it is on top of two blocks (FIG. 3B), but its size is not an integral multiple of the block size. In such a case, the daemon application needs to first get the related block from a "read" process of the backup repository, then merge this block with the data of the "write" request, and then write the resulting data to the data file (not the backup repository). There should be no "write" request (i.e., a write request that requires special handling) to the descriptive file. If there is "write request", the daemon application will not do any special processing. It just fulfills the request by writing to the descriptive file on the original volume.

In an embodiment, there is special processing for a virtual machine disk (VMDK). The daemon application will create two files. First, a diskname.vmdk file is created. This is a descriptive text file. It contains the information of the VMDK virtual disk and a reference to the data file, diskname-flat.vmdk. It follows "The Descriptor File" section in specification Virtual Disk Format 1.1 published by VMware. There is no special processing for this file. Second, a diskname-flat.vmdk is created. It represents the data file of the virtual disk. It's actually a sparse file that contains no data initially. Its size must be the same as the size of the original disk (the disk which had been backed up). All "read" and "write" requests to this file are processed as described above. The "diskname.vmdk" and "diskname-flat.vmdk" files compose VMDK virtual disk. The "diskname.vmdk" file is the file that is referenced by hypervisor.

In an embodiment, there is special processing for the virtual hard disk (VHD). The daemon application will create two files. First, a diskname.meta file is created. This is the meta data for diskname.vhd. It has a fixed size of 512 bytes. The contents of this file follow "Hard Disk Footer Format" in Virtual Hard Disk Format Specification published by Microsoft. Second, a diskname.vhd file is created. This file represents the data file of the virtual disk. It's actually a sparse file that contains no data initially. Its size must be the same as the size of the original disk plus 512 bytes. All "read" and "write" requests to this file are processed as described above. However, "read" and "write" requests to the end 512 bytes of the file are redirected to diskname.meta. The "diskname.vhd" file is the virtual disk that can be used by hypervisor. There should be no direct access to "diskname.meta" from hypervisor.

An embodiment provides a method that can convert disk to disk backup to virtual disk image on the fly and on demand. A user can get a virtual disk immediately at anytime that he or she wants a virtual disk. There is no need to wait and no need to prepare the virtual disk in advance. The embodiment saves much time and hardware resources (CPU time, network bandwidth, disk I/O and disk space) for end user.

The embodiments are platform independent. They can be implemented on both Windows and Linux (of course, the implementation itself is platform dependent). The embodiments are widely compatible with most of known hypervisor platforms.

Figure 4A:
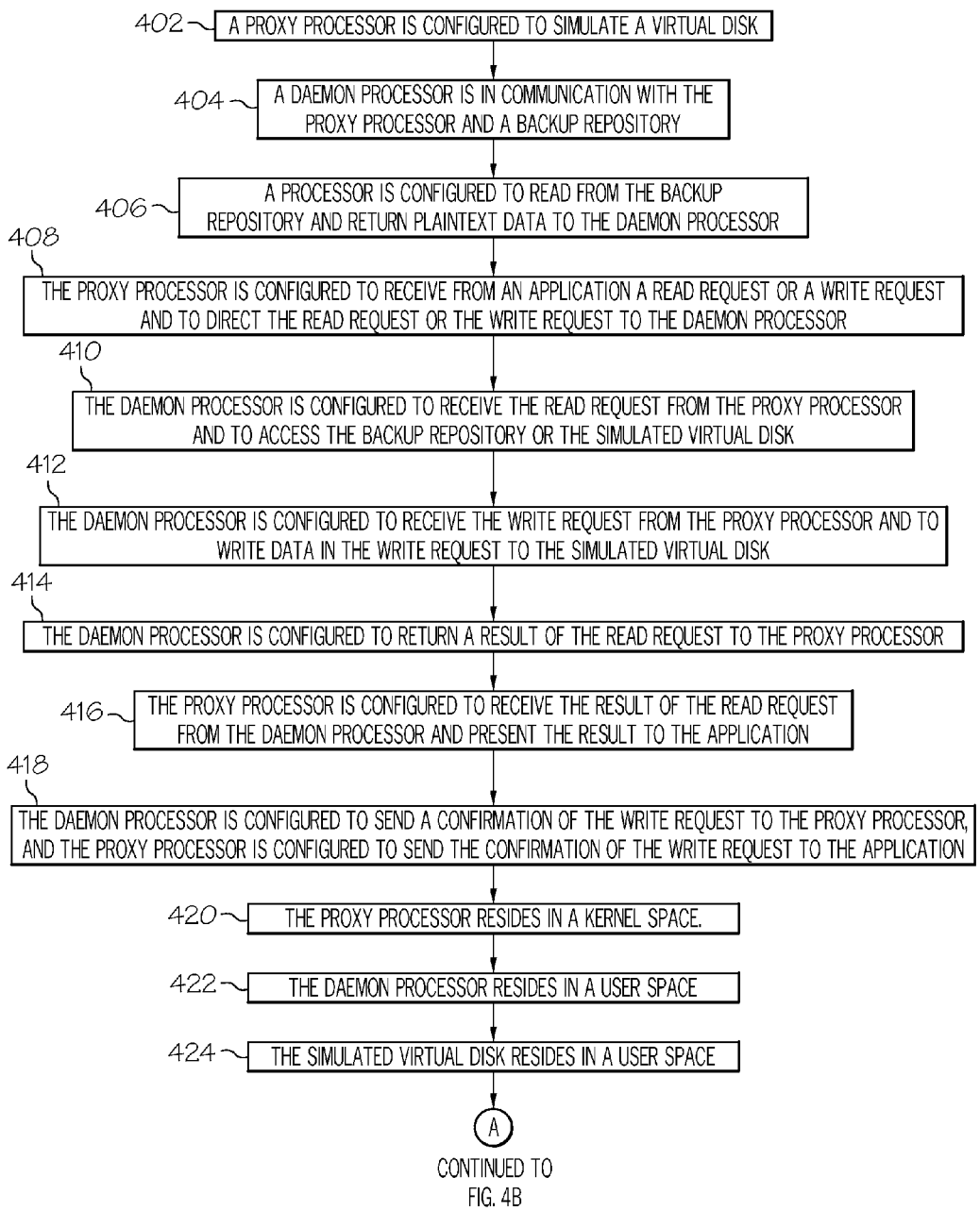
FIGS. 4A and 4B illustrate a method and features of executing a data recovery using conversion of backup data to a virtual disk.
Figure 4B:
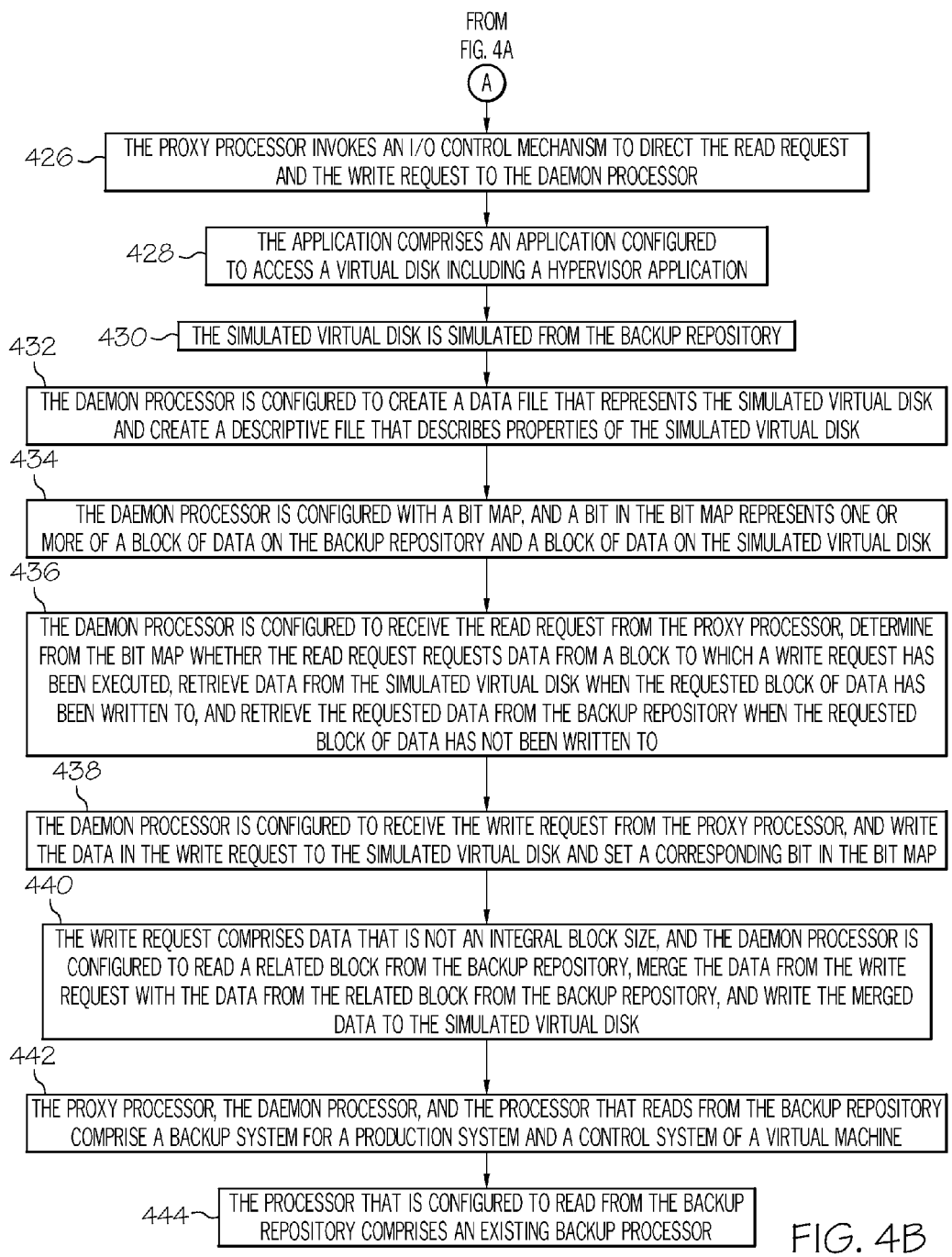

FIGS. 4A and 4B are a flowchart-like diagram that illustrates the steps and or features of one or more of the embodiments disclosed herein. Specifically, at 402, a proxy processor is configured to simulate a virtual disk. At 404, a daemon processor is in communication with the proxy processor and a backup repository. At 406, a processor is configured to read from the backup repository and return plaintext data to the daemon processor. At 408, the proxy processor is configured to receive from an application a read request or a write request and to direct the read request or the write request to the daemon processor. At 410, the daemon processor is configured to receive the read request from the proxy processor and to access the backup repository or the simulated virtual disk. At 412, the daemon processor is configured to receive the write request from the proxy processor and to write data in the write request to the simulated virtual disk.

At 414, the daemon processor is configured to return a result of the read request to the proxy processor, and at 416, the proxy processor is configured to receive the result of the read request from the daemon processor and present the result to the application. At 418, the daemon processor is configured to send a confirmation of the write request to the proxy processor, and the proxy processor is configured to send the confirmation of the write request to the application. At 420, the proxy processor resides in a kernel space. At 422, the daemon processor resides in a user space. At 424, the simulated virtual disk resides in a user space.

At 426, the proxy processor invokes an I/O control mechanism to direct the read request and the write request to the daemon processor. At 428, the application comprises an application configured to access a virtual disk including a hypervisor application. At 430, the simulated virtual disk is simulated from the backup repository. At 432, the daemon processor is configured to create a data file that represents the simulated virtual disk and create a descriptive file that describes properties of the simulated virtual disk.

At 434, the daemon processor is configured with a bit map, and a bit in the bit map represents one or more of a block of data on the backup repository and a block of data on the simulated virtual disk. At 436, the daemon processor is configured to receive the read request from the proxy processor, determine from the bit map whether the read request requests data from a block to which a write request has been executed, retrieve data from the simulated virtual disk when the requested block of data has been written to, and retrieve the requested data from the backup repository when the requested block of data has not been written to. At 438, the daemon processor is configured to receive the write request from the proxy processor, and write the data in the write request to the simulated virtual disk and set a corresponding bit in the bit map. At 440, the write request comprises data that is not an integral block size, and the daemon processor is configured to read a related block from the backup repository, merge the data from the write request with the data from the related block from the backup repository, and write the merged data to the simulated virtual disk.

At 442, the proxy processor, the daemon processor, and the processor that reads from the backup repository comprise a backup system for a production system and a control system of a virtual machine. At 444, the processor that is configured to read from the backup repository comprises an existing backup processor.

Figure 5:
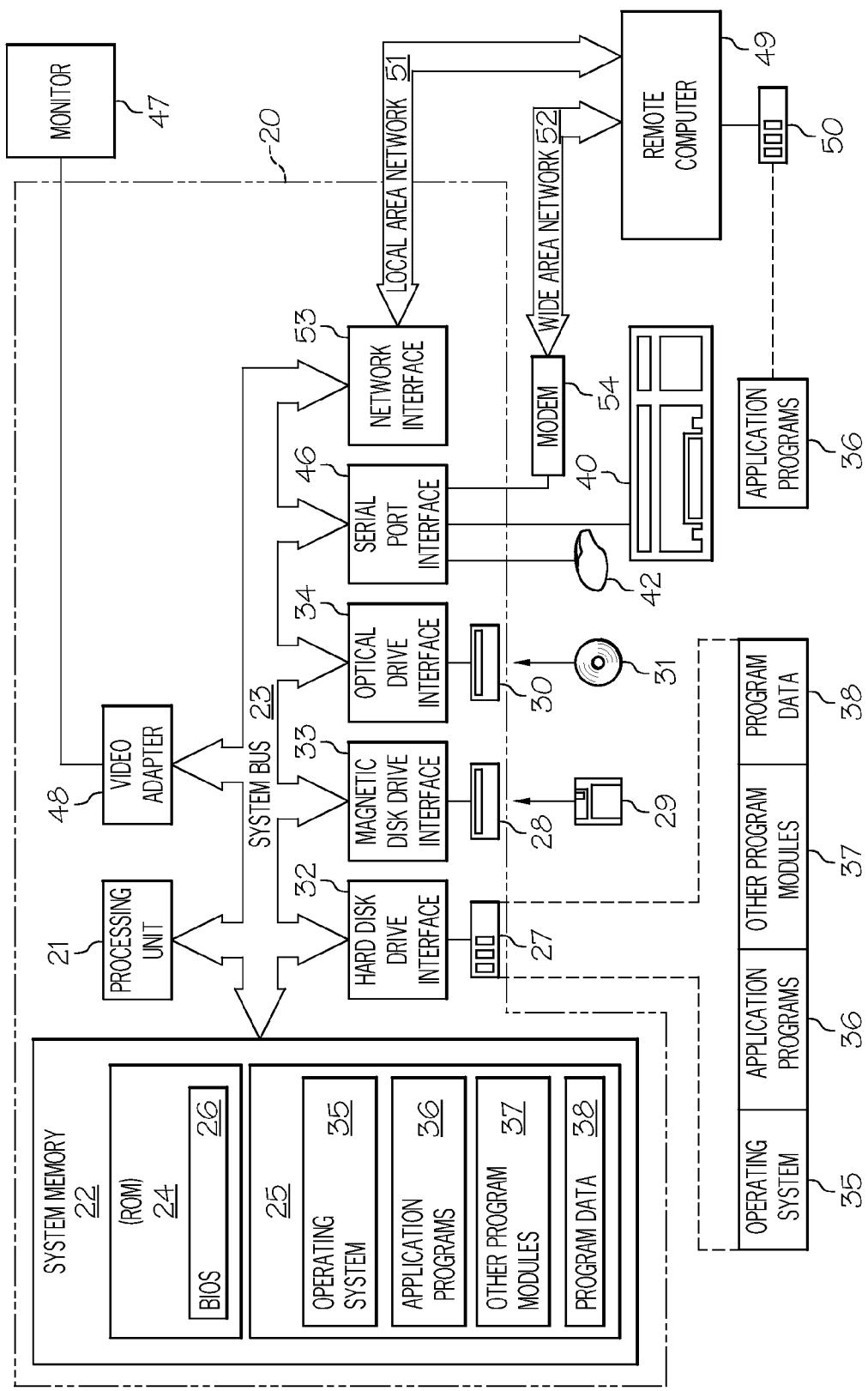
FIG. 5 is a block diagram of an embodiment of a computer system upon which an embodiment of the present disclosure can execute.

FIG. 5 is an overview diagram of hardware and an operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A system comprising:
    a proxy processor configured to simulate a virtual disk;
    a daemon processor in communication with the proxy processor and a non-transitory backup repository containing a backup of a production machine; and
    a processor configured to read from the backup repository and return plaintext data to the daemon processor;
    wherein the proxy processor is configured to receive from an application read requests and write requests and to direct the read requests and write requests to the daemon processor;
    wherein the daemon processor is configured to receive the read requests from the proxy processor and to access the backup repository or the simulated virtual disk if a read request is for data already written to the simulated virtual disk; and
    wherein the daemon processor is configured to receive the write requests from the proxy processor and to write data in the write requests to the simulated virtual disk to convert the backup repository on demand to the simulated virtual disk usable by a virtual machine to function like the production machine.

2. The system of claim 1,
    wherein the daemon processor is configured to return a result of the read request to the proxy processor;
    wherein the proxy processor is configured to receive the result of the read request from the daemon processor and present the result to the application.

3. The system of claim 1, wherein the daemon processor is configured to send a confirmation of the write request to the proxy processor, and the proxy processor is configured to send the confirmation of the write request to the application.

4. The system of claim 1, wherein the proxy processor resides in a kernel space.

5. The system of claim 1, wherein the daemon processor resides in a user space.

6. The system of claim 1, wherein the simulated virtual disk resides in a user space.

7. The system of claim 1, wherein the proxy processor invokes an I/O control mechanism to direct the read requests and the write requests to the daemon processor.

8. The system of claim 1, wherein the application comprises an application configured to access a virtual disk including a hypervisor application.

9. The system of claim 1, wherein the simulated virtual disk is simulated from the backup repository.

10. The system of claim 1, wherein the daemon processor is configured to:
    create a data file that represents the simulated virtual disk; and
    create a descriptive file that describes properties of the simulated virtual disk.

11. The system of claim 1, wherein the daemon processor is configured with a bit map; and wherein a bit in the bit map represents one or more of a block of data on the backup repository and a block of data on the simulated virtual disk.

12. The system of claim 11, wherein the daemon processor is configured to:
    receive the read request from the proxy processor;
    determine from the bit map whether the read request requests data from a block to which a write request has been executed;
    retrieve data from the simulated virtual disk when the requested block of data has been written to; and
    retrieve the requested data from the backup repository when the requested block of data has not been written to.

13. The system of claim 11, wherein the daemon processor is configured to:
    receive the write request from the proxy processor; and
    write the data in the write request to the simulated virtual disk and set a corresponding bit in the bit map.

14. The system of claim 13, wherein the write request comprises data that is not an integral block size; and the daemon processor is configured to read a related block from the backup repository, merge the data from the write request with the data from the related block from the backup repository, and write the merged data to the simulated virtual disk.

15. The system of claim 1, wherein the proxy processor, the daemon processor, and the processor that reads from the backup repository comprise a backup system for a production system and a control system of a virtual machine.

16. The system of claim 1, wherein the processor that is configured to read from the backup repository comprises an existing backup processor.

17. A method comprising:
    receiving at a daemon processor a read request or a write request from a proxy processor, wherein the read request or the write request was received by the proxy processor from an application;
    writing data in the write request to a simulated virtual disk using the daemon processor to convert a backup repository on demand to the simulated virtual disk usable by a virtual machine to function like a production machine corresponding to the backup repository; and
    reading data from a backup repository or the simulated virtual disk if a read request is for data already written to the simulated virtual disk using the daemon processor.

18. The method of claim 17, comprising:
    returning a result of the read request from the daemon processor to the proxy processor; and
    presenting the result to the application.

19. The method of claim 17, comprising sending a confirmation of the write request from the daemon processor to the proxy processor and sending the confirmation of the write request to the application.

20. The method of claim 17, comprising invoking an I/O control mechanism to direct the read request and the write request to the daemon processor.

21. The method of claim 17, comprising accessing a virtual disk including a hypervisor application.

22. The method of claim 17, comprising simulating the simulated virtual disk from the backup repository.

23. The method of claim 17, comprising:
creating a data file that represents the simulated virtual disk; and
creating a descriptive file that describes properties of the simulated virtual disk.

24. The method of claim 17, comprising configuring a bit map; wherein a bit in the bit map represents one or more of a block of data on the backup repository and a block of data on the simulated virtual disk.

25. The method of claim 24, comprising:
receiving the read request from the proxy processor;
determining from the bit map whether the read request requests data from a block to which a write request has been executed;
retrieving data from the simulated virtual disk when the requested block of data has been written to; and
retrieving the requested data from the backup repository when the requested block of data has not been written to.

26. The method of claim 24, comprising:
receiving the write request from the proxy processor; and
writing the data in the write request to the simulated virtual disk and set a corresponding bit in the bit map.

27. The method of claim 26, wherein the write request comprises data that is not an integral block size; and the daemon processor is configured to read a related block from the backup repository, merge the data from the write request with the data from the related block from the backup repository, and write the merged data to the simulated virtual disk.

28. A non-transitory computer program product comprising:
a computer readable storage medium having computer readable program code embodied therewith, the computer readable program code comprising:
computer readable code configured to receive at a daemon processor a read request or a write request from a proxy processor, wherein the read request or the write request was received by the proxy processor from an application;
computer readable code configured to write data in the write request to a simulated virtual disk using the daemon processor to convert a backup repository on demand to the simulated virtual disk usable by a virtual machine to function like a production machine corresponding to the backup repository; and
computer readable code configured to read data from a backup repository or the simulated virtual disk if a read request is for data already written to the simulated virtual disk using the daemon processor.

29. A system comprising:
a proxy processor configured to simulate a non-transitory virtual disk; and
a daemon processor in communication with the proxy processor and a backup repository containing a backup of a production machine;
wherein the proxy processor is configured to receive from an application read requests and write requests and to direct the read requests and write requests to the daemon processor;
wherein the daemon processor is configured to receive the read request from the proxy processor and to access the backup repository or the simulated virtual disk if a read request is for data already written to the simulated virtual disk; and
wherein the daemon processor is configured to receive the write request from the proxy processor and to write data in the write request to the simulated virtual disk to convert the backup repository on demand to the simulated virtual disk usable by a virtual machine to function like the production machine.

30. The system of claim 29, comprising a processor configured to read from the backup repository and return plain-text data to the daemon processor.

* * * * *